US009344210B2

(12) United States Patent
Moynihan et al.

(10) Patent No.: US 9,344,210 B2
(45) Date of Patent: May 17, 2016

(54) OTN RATE ADJUSTMENT SYSTEMS AND METHODS FOR CONTROL PLANE RESTORATION, CONGESTION CONTROL, AND NETWORK UTILIZATION

(71) Applicants: Jeffrey Scott Moynihan, Cumming, GA (US); Matthew W. Connolly, Canton, GA (US)

(72) Inventors: Jeffrey Scott Moynihan, Cumming, GA (US); Matthew W. Connolly, Canton, GA (US)

(73) Assignee: Ciena Corporation, Hanover, MD (US)

( * ) Notice: Subject to any disclaimer, the term of this patent is extended or adjusted under 35 U.S.C. 154(b) by 98 days.

(21) Appl. No.: 14/176,246

(22) Filed: Feb. 10, 2014

(65) Prior Publication Data
US 2015/0229424 A1 Aug. 13, 2015

(51) Int. Cl.
*H04J 3/00* (2006.01)
*H04J 3/16* (2006.01)
*H04L 12/64* (2006.01)

(52) U.S. Cl.
CPC ............ *H04J 3/1664* (2013.01); *H04L 12/6418* (2013.01); *H04J 2203/0067* (2013.01); *H04J 2203/0089* (2013.01); *H04J 2203/0098* (2013.01)

(58) Field of Classification Search
CPC ............ H04J 3/1664; H04J 2203/0089; H04J 2203/0098; H04J 2203/0067
See application file for complete search history.

(56) References Cited

U.S. PATENT DOCUMENTS

| 8,259,733 | B2 * | 9/2012 | Conklin | H04J 3/1652 370/395.51 |
|---|---|---|---|---|
| 8,306,420 | B2 * | 11/2012 | Conklin | H04J 14/0227 398/52 |
| 8,356,233 | B2 * | 1/2013 | Nichols | H04J 3/1611 713/161 |
| 8,417,111 | B2 * | 4/2013 | Moynihan | H04J 3/1611 398/1 |
| 8,509,113 | B2 * | 8/2013 | Connolly | H04L 49/15 370/254 |
| 8,559,812 | B2 * | 10/2013 | Oltman | H04J 3/14 398/1 |
| 2002/0059408 | A1 * | 5/2002 | Pattabhiraman | H04J 3/085 709/223 |
| 2009/0285574 | A1 * | 11/2009 | Liu | H04J 3/1652 398/2 |

(Continued)

FOREIGN PATENT DOCUMENTS

WO    2012130106 A1    10/2012

OTHER PUBLICATIONS

Recommendation ITU-T G.7044/Y.1347, "Hitless adjustment of ODUflex(GFP)", Oct. 2011.

*Primary Examiner* — Danny Leung
(74) *Attorney, Agent, or Firm* — Clements Bernard PLLC; Christopher L. Bernard; Lawrence A. Baratta, Jr.

(57) ABSTRACT

A method, a controller, and an Optical Transport Network (OTN) network include provisioning an end-to-end path with a defined committed information rate (CIR) and a peak information rate (PIR) via an optical control plane; computing a path for the end-to-end path based on the CIR and the PIR; configuring the end-to-end path on the computed path at an Optical Channel Data Unit (ODU) data rate supporting the PIR if the computed path can support the PIR or at the ODU data rate supporting the CIR if the computed path can support the CIR and not the PIR; and adjusting the ODU data rate of the end-to-end path based on a rate adjustment requirement in the OTN network and based on the CIR and the PIR.

20 Claims, 8 Drawing Sheets

(56) References Cited

U.S. PATENT DOCUMENTS

| | | | | |
|---|---|---|---|---|
| 2012/0002965 A1* | 1/2012 | Bellato | H04J 3/1652 | 398/52 |
| 2012/0082456 A1* | 4/2012 | Su | H04J 3/1652 | 398/58 |
| 2012/0106950 A1* | 5/2012 | Madrahalli | H04J 3/065 | 398/25 |
| 2012/0213508 A1* | 8/2012 | Moynihan | H04J 3/1658 | 398/25 |
| 2013/0114953 A1* | 5/2013 | Moynihan | H04B 10/032 | 398/5 |
| 2013/0142509 A1* | 6/2013 | Connolly | H04J 3/1652 | 398/44 |
| 2013/0208595 A1* | 8/2013 | Connolly | H04L 47/266 | 370/235 |
| 2013/0236169 A1* | 9/2013 | Gaudette | H04B 10/0793 | 398/25 |
| 2013/0242721 A1* | 9/2013 | Moynihan | H04L 41/0659 | 370/225 |
| 2013/0308945 A1* | 11/2013 | Dhillon | H04Q 11/0003 | 398/48 |
| 2013/0343747 A1* | 12/2013 | Sarwar | H04L 43/0852 | 398/25 |
| 2014/0016925 A1* | 1/2014 | Ceccarelli | H04J 3/1652 | 398/5 |
| 2014/0044431 A1* | 2/2014 | Hussain | H04J 14/0227 | 398/79 |
| 2014/0199067 A1* | 7/2014 | Ahuja | H04Q 11/0066 | 398/52 |
| 2014/0226981 A1* | 8/2014 | Kuwabara | H04J 3/1652 | 398/65 |
| 2015/0082319 A1* | 3/2015 | Liu | G06F 9/3851 | 718/107 |

\* cited by examiner

OTN RATE ADJUSTMENT SYSTEMS AND METHODS FOR CONTROL PLANE RESTORATION, CONGESTION CONTROL, AND NETWORK UTILIZATION

FIELD OF THE DISCLOSURE

The present disclosure relates generally to optical networking systems and methods. More particularly, the present disclosure relates to Optical Transport Network (OTN) rate adjustment to facilitate control plane restoration, congestion control, and network utilization.

BACKGROUND OF THE DISCLOSURE

Optical Transport Network (OTN) is defined in various ITU Specifications such as, for example, ITU G.709/Y.1331 (December 2009) "Interfaces for the Optical Transport Network (OTN)," the contents of which are herein incorporated by reference. OTN allows network operators to converge networks through seamless transport of the numerous types of legacy protocols while providing the flexibility required to support future client protocols. Optical (i.e., transport) networks and the like (e.g., wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in G.8080/Y.1304, Architecture for the automatically switched optical network (ASON) (February/2005), the contents of which are herein incorporated by reference; Generalized Multi-Protocol Label Switching (GMPLS) Architecture as defined in Request for Comments (RFC): 3945 (October/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween.

In OTN control plane networks, a sub-network connection (SNC) for ASON and OSRP or Optical channel Data Unit (ODU) label switched path (LSP) for GMPLS are established at specific rates depending on either the standard Optical channel Data Unit level k (ODUk) rates, where k=0, 1, 2, 2e, 3, 3e2, 4, etc.) or the client rate in the case of ODUflex. Note, SNCs and ODU LSPs (or simply LSPs) can both be referred to as end-to-end paths or end-to-end signaled paths. For packet clients mapped to OTN, the client determines the OTN rate. These rates can be based on standard rates such as 1 Gigabit Ethernet (GbE), 10 GbE, 40 GbE, 100 GbE, etc., or on sub-rates such as a 100 Gb Physical Layer running at 50 Gb/s. In either case, the ODU container must be established at a rate high enough to transport the incoming packets. Service providers offer customers a committed information rate (CIR) and a peak information rate (PIR), where PIR could be a rate provided with best effort availability. These values will be typically defined as part of a service level agreement (SLA). The Layer 2 rate determines the Layer 1 SNC/LSP rate required to carry the service.

During initial establishment of the SNC/LSP, the control plane network nominally has been architected to support the SNC/LSP at a particular rate. However, after a network failure the control plane network may not be able to restore some or all of the affected SNC/LSP's due to limited bandwidth in the network. In addition, network planning and traffic demands are not always predictable, and over-subscription of the network may be required. Conventionally, Layer 1 OTN connections are a fixed size and do not adapt to higher layer CIR/PIR. If the OTN connection size changes, it is typically a result of operator intervention. In the present state of the art, if an OTN circuit goes down, and there is insufficient bandwidth available within the network to replace that circuit, the service remains down, even though there may have sufficient bandwidth to support the underlying net CIR for the Layer 2 services. There are no conventional systems and methods to handle bottlenecks in OTN networks where bandwidth can be dynamically allocated to manage the congestion, while keeping service up on existing circuits.

BRIEF SUMMARY OF THE DISCLOSURE

In various exemplary embodiments, OTN rate adjustment systems and methods are described to introduce dynamic bandwidth allocation and congestion control concepts, such as in packet-based technologies, to OTN. The OTN rate adjustment systems and methods apply concepts of committed information rate (CIR), excess information rate (EIR), and peak information rate (PIR) to Optical channel Data Unit (ODU) sub-network connections (SNCs) (ASON or OSRP) or Optical channel Data Unit (ODU) label switched paths (LSP) (GMPLS). Within the context of the CIR, EIR, and PIR, the ODU SNCs/LSPs can have their size readjusted based on requirements in the network, such as during restoration, for congestion control, or for improved network utilization.

In an exemplary embodiment, a method includes provisioning an end-to-end path with a defined committed information rate (CIR) and a peak information rate (PIR) via an optical control plane; computing a path for the end-to-end path based on the CIR and the PIR; configuring the end-to-end path on the computed path at an Optical Channel Data Unit (ODU) data rate supporting the PIR if the computed path can support the PIR or at the ODU data rate supporting the CIR if the computed path can support the CIR and not the PIR; and adjusting the ODU data rate of the end-to-end path based on a rate adjustment requirement in the OTN-based network and based on the CIR and the PIR. The rate adjustment requirement can be based on one of restoration, congestion control, and network utilization. The method can further include detecting a network failure in the OTN-based network and being unable to restore the end-to-end path at the PIR; and performing the adjusting of the ODU data rate such that the end-to-end path can be restored from the network failure.

The method can further include provisioning a second end-to-end path with an associated CIR and PIR; determining a congested link shared by the end-to-end path and the second end-to-end path preventing the second end-to-end path from being configured at its associated CIR; and implementing a fair reduction in size of the end-to-end path enabling the second end-to-end path to be set up. The end-to-end path can include one of an Optical channel Data Unit level k (ODUk) and an Optical Channel Data Unit-flex (ODUflex). The end-to-end path can include an Optical channel Data Unit level k (ODUk) and the adjusting can include switching between different values of k with k=0, 1, 2, 2e, 3, 3e2, 4 and shaping client traffic input therein. The end-to-end path can include an Optical Channel Data Unit-flex (ODUflex) and the adjusting can include utilizing hitless ODUflex resizing mechanisms defined in ITU-T G.7044.

The method can further include altering a rate of client flows into the end-to-end path subsequent to the rate adjustment with a scheduler and shaper. The method can further include altering a rate of client flows into the end-to-end path subsequent to the rate adjustment via Layer 2 pauses. The method can further include performing the computing and the configuring via one of a control plane, a management system, a path computation element (PCE), a software defined networking (SDN) controller, an OpenFlow controller, and a combination thereof.

In another exemplary embodiment, a controller includes a processor; memory storing instructions that, when executed, cause the processor to: receive a request for an end-to-end path with a defined committed information rate (CIR) and a peak information rate (PIR) in an Optical Transport Network (OTN)-based network: compute a path for the end-to-end path based on the CIR and the PIR; cause the end-to-end path to be configured on the computed path at an Optical Channel Data Unit (ODU) data rate supporting the PIR if the computed path can support the PIR or at the ODU data rate supporting the CIR if the computed path can support the CIR and not the PIR; and cause the ODU data rate to be adjusted based on a rate adjustment requirement in the OTN-based network and based on the CIR and the PIR. The rate adjustment requirement can be based on one of restoration, congestion control, and network utilization. The instructions, when executed, can further cause the processor to: detect a network failure in the OTN-based network with an inability to restore the end-to-end path at the PIR; and cause the ODU data rate to be adjusted such that the end-to-end path can be restored from the network failure.

The instructions, when executed, can further cause the processor to: receive a request to provision a second end-to-end path with an associated CIR and PIR; determine a congested link shared by the end-to-end path and the second end-to-end path preventing the second end-to-end path from being configured at its associated CIR; and cause a fair reduction in size of the end-to-end path enabling the second end-to-end path to be set up. The end-to-end path can include one of an Optical channel Data Unit level k (ODUk) and an Optical Channel Data Unit-flex (ODUflex). The end-to-end path can include an Optical channel Data Unit level k (ODUk) and the adjusting can include switching between different values of k with k=0, 1, 2, 2e, 3, 3e2, 4 and shaping client traffic input therein. The end-to-end path can include an Optical Channel Data Unit-flex (ODUflex) and the adjusting can include utilizing hitless ODUflex resizing mechanisms defined in ITU-T G.7044. The controller can include one of a control plane processor communicatively coupled to a node, a management system, a path computation element (PCE), a software defined networking (SDN) controller, an OpenFlow controller, and a combination thereof.

In yet another exemplary embodiment, a Optical Transport Network (OTN)-based network includes a plurality of interconnected nodes operating an optical control plane therebetween; an end-to-end path controlled by the optical control plane with a defined committed information rate (CIR) and a peak information rate (PIR) implemented through at least two of the plurality of interconnected nodes; and a controller configured to cause the end-to-end path to adjust an Optical Channel Data Unit (ODU) data rate based on a rate adjustment requirement in the OTN-based network and based on the CIR and the PIR. The rate adjustment requirement can be based on one of restoration, congestion control, and network utilization.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, OTN rate adjustment systems and methods are described to facilitate control plane restoration, congestion control, and network utilization. Conventionally, Layer 1 OTN connections are of fixed size and do not adapt to higher layer CIR/PIR, i.e. conventional OTN rate changes are typically due to operator intervention. The OTN rate adjustment systems and methods apply dynamic bandwidth allocation and congestion control concepts, such as in packet-based technologies, to OTN. The OTN rate adjustment systems and methods allow services, which may not be restorable after a network failure, to restore by using less network resources. Additionally, the OTN rate adjustment systems and methods allow the addition of services to a network without increasing the network resources by reducing the rate Layer 1 services as allowed by supported Layer 2 services.

Figure 1:
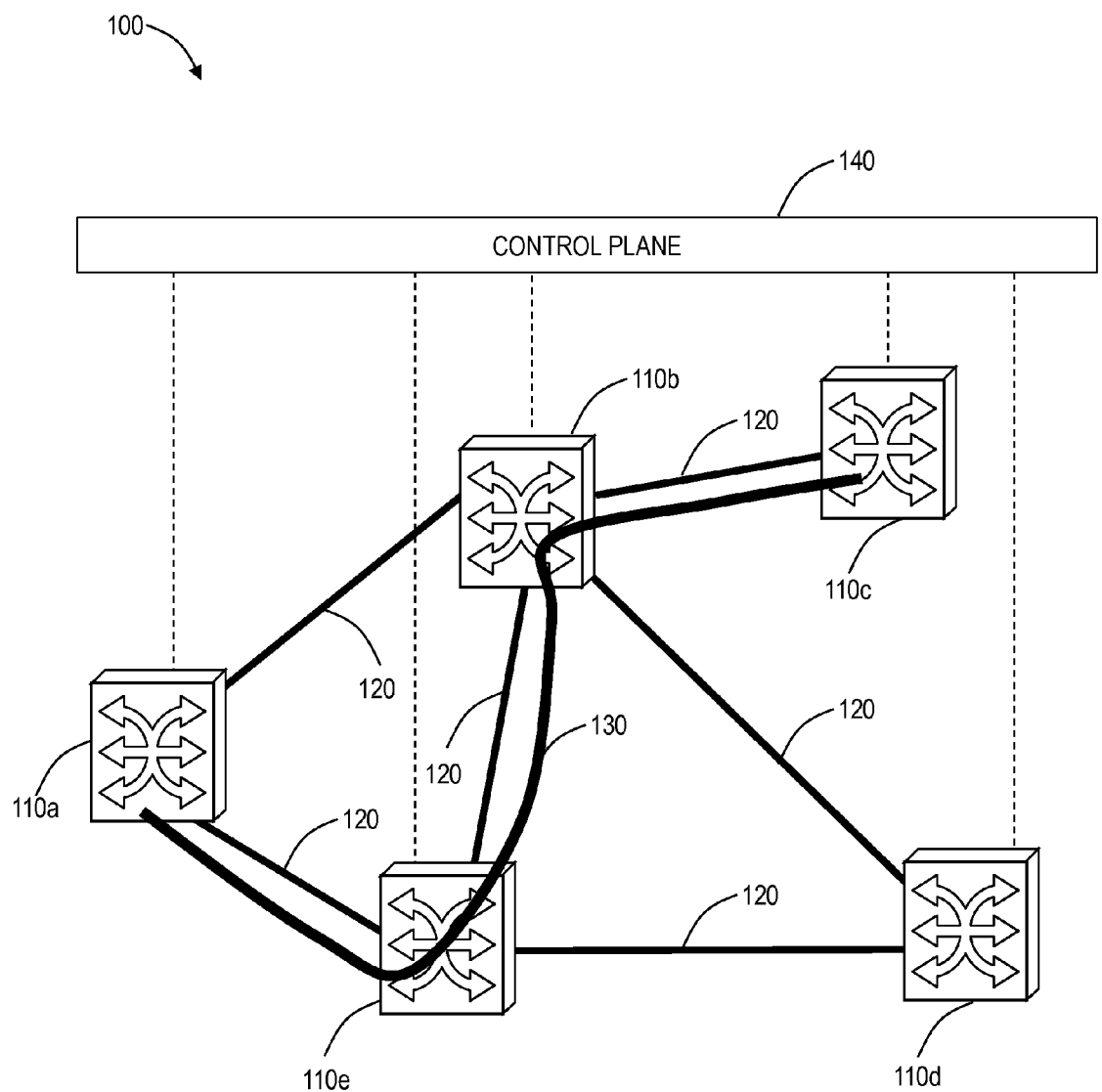
FIG. 1 is a network diagram of an exemplary OTN network with five interconnected nodes.
Figure 4:
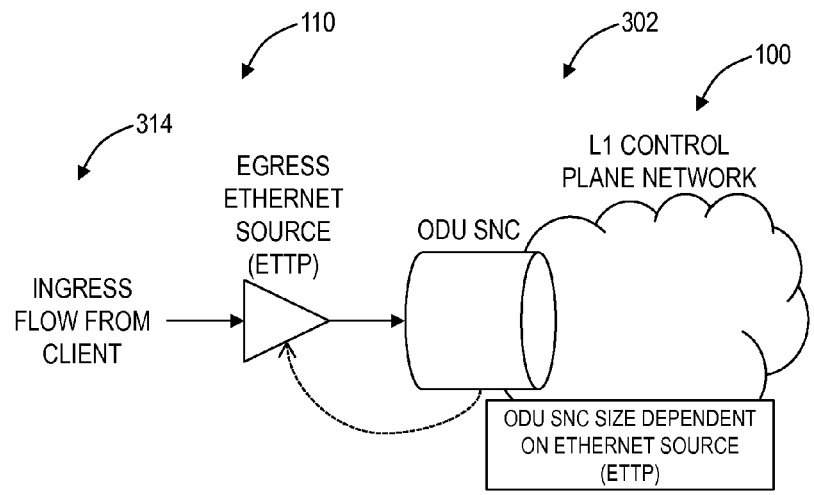
FIG. 4 is a network diagram of another exemplary scenario of efficient restoration via a node communicatively coupled to the OTN network of FIG. 1.

Referring to FIG. 1, in an exemplary embodiment, a network diagram illustrates an exemplary OTN network 100 with five interconnected nodes 110a, 110b, 110c, 110d, 110e. The nodes 110 are interconnected through a plurality of links 120. The nodes 110 communicate with one another over the links 120 through OTN. The nodes 110 can be network elements which include a plurality of ingress and egress ports forming the links 120. An exemplary node 110A is illustrated in FIG. 4. The network 100 includes a connection 130 with ingress/egress at the nodes 110a, 110c and intermediate nodes 110b, 110e. The connection 130 can be a sub-network connection (SNC) (or an LSP) established at specific rates depending on either the standard ODUk rates (where k=0, 1, 2, 2e, 3, 3e2, 4, etc.) or the client rate in the case of ODUflex. The connection 130 is an end-to-end path or an end-to-end signaled path and from the view of the client signal contained therein, it is seen as a single network segment. These rates can be based on standard rates such as 1 Gigabit Ethernet, 10 Gigabit Ethernet, 40 Gigabit Ethernet, 100 Gigabit Ethernet, etc., or on sub-rates such as a 100 Gigabit Ethernet Physical Layer running at 50 Gb/s. The nodes 110 can also be referred to interchangeably as network elements (NEs). The OTN network 100 is illustrated, for example, as an interconnected mesh network, and those of ordinary skill in the art will recognize the OTN network 100 can include other architectures, with additional nodes 110 or with less nodes 110, etc.

The OTN network 100 can include a control plane 140 operating on and/or between the nodes 110a, 110b, 110c, 110d, 110e. The control plane 140 includes software, processes, algorithms, etc. that control configurable features of the OTN network 100, such as automating discovery of the nodes 110, capacity on the links 120, port availability on the nodes 110, connectivity between ports; dissemination of topology and bandwidth information between the nodes 110; calculation and creation of paths for connections; network level protection and restoration; and the like. In an exemplary embodiment, the control plane 140 can utilize ASON, GMPLS, OSRP, or the like. Those of ordinary skill in the art will recognize the OTN network 100 and the control plane 140 can utilize any type control plane for controlling the nodes 110 and establishing connections therebetween. The OTN network 100 can be referred to as a Layer 1 (L1) control plane network which may implement the OTN rate adjustment systems and methods described herein.

In the terminology of ASON and OSRP, sub-network connections (SNC) are end-to-end signaled paths since from the point of view of a client signal, each is a single network segment. In GMPLS, the SNCs are an end-to-end path referred to as an Optical channel Data Unit (ODU) label switched path (LSP). For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In the various descriptions herein, reference is made to SNCs for illustration only of an exemplary embodiment of the OTN rate adjustment systems and methods. Those of ordinary skill in the art will recognize that SNCs and ODU LSPs (or simply LSPs) can both be used with the systems and methods described herein for end-to-end paths. That is, for GMPLS-based systems, the connection 130 would be referred to as an LSP or an ODU LSP. The term end-to-end path as used herein may refer to an SNC, an LSP, etc. and an optical control plane may include ASON, OSRP, GMPLS, etc.

The OTN rate adjustment systems and methods allow the OTN network 100 to adapt in real-time according to Layer 2 CIR/PIR values, making more efficient use of Layer 1 bandwidth, and allowing Layer 1 SNCs to adaptively resize during circuit creation, deletion, and restoration, making use of hitless OTN resizing methods such as ITU-T G.7044, "Hitless adjustment of ODUflex(GFP)" (10/11), the contents of which are incorporated by reference herein. In mesh networks, such as the OTN network 100, this ability to resize greatly increases the efficiency of the OTN network 100. Additionally the OTN rate adjustment systems and methods enable service providers to offer different classes of service that otherwise may not have been possible. Advantageously, the OTN rate adjustment systems and methods can be used for efficient restoration, congestion control, and the like.

Figure 2:
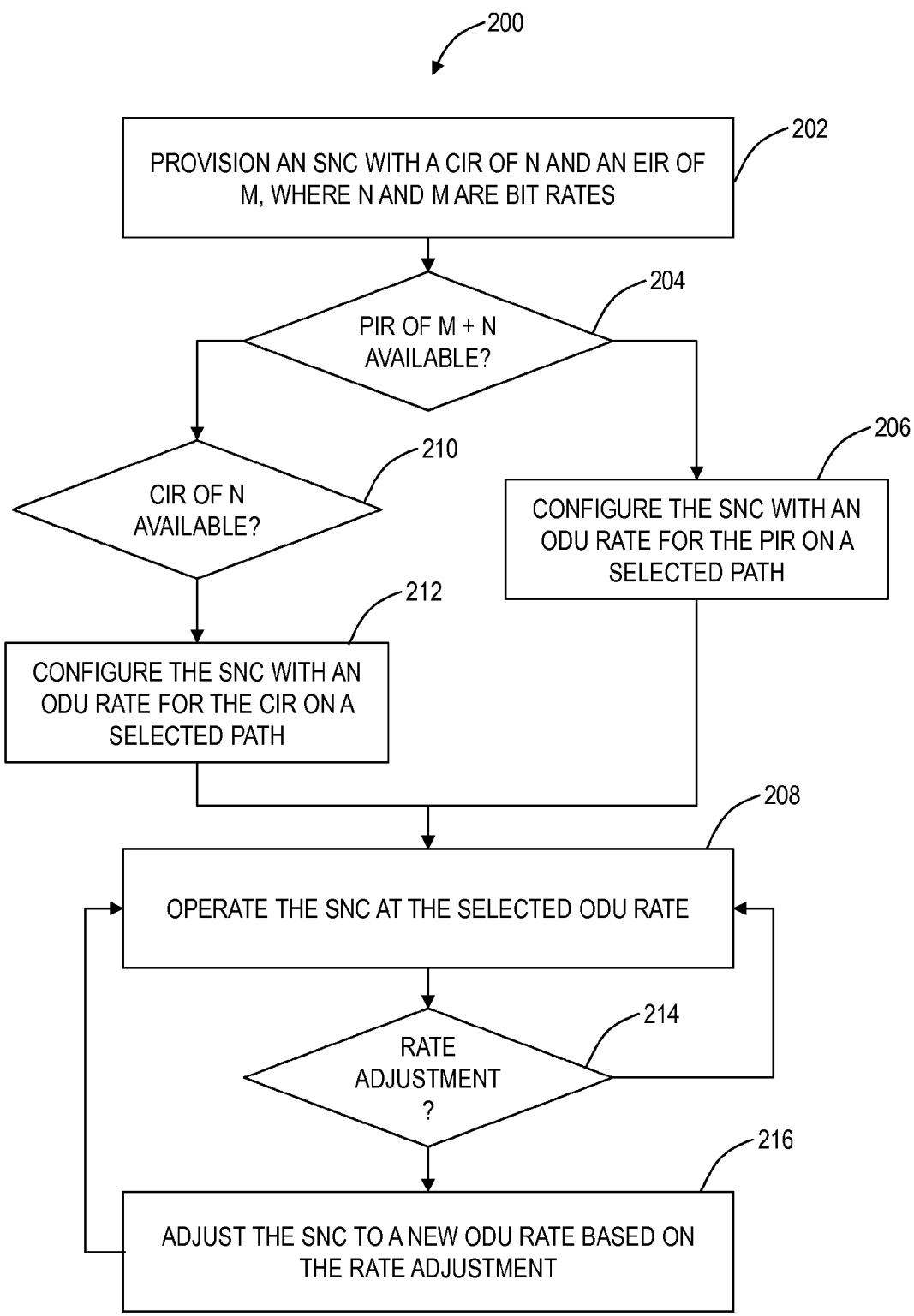
FIG. 2 is a flowchart of an OTN rate adjustment method.

Referring to FIG. 2, in an exemplary embodiment, a flowchart illustrates an OTN rate adjustment method 200. The OTN rate adjustment method 200 contemplates operation in the OTN network 100, on and between the nodes 110, and/or with the control plane 140. The OTN rate adjustment method 200 includes provisioning an SNC with a CIR of N and an excess information rate (EIR) of M, where N and M are bit rates (step 202). Specifically, the OTN rate adjustment method 200 utilizes Layer 2+ concepts of CIR, EIR, and PIR where CIR is a committed rate, EIR is an excess rate, and PIR is the peak rate or CIR+EIR. In this manner, the OTN rate adjustment method 200 makes Layer 1 elastic like Layer 2 and above. CIR and EIR can be express in bit rates such as X Gb/s each. For example, a CIR of 6 Gb/s and an EIR of 4 Gb/s would be a PIR of 10 Gb/s and require an ODU2 or an ODUflex capable of supporting 10 Gb/s. A key aspect of the OTN rate adjustment method 200 is segmenting the bandwidth required on the OTN network 100 as CIR and EIR. From the control plane 140 and the OTN network 100 perspective, the SNC may be provisioned only if enough CIR is available on a path, if the PIR is available on the path, or if less than the CIR is available on the path. In this manner, the OTN rate adjustment method 200 enables flexible rates at Layer 1.

The OTN rate adjustment method 200 can check if a path is available for a PIR of M+N (CIR+EIR) (step 204). If a path is available (step 204) the OTN rate adjustment method 200 can configure the SNC with an ODU rate for the PIR on a selected path (step 206), and the SNC can operate at the selected ODU rate (step 208). If the path is not available (step 204), the OTN rate adjustment method 200 can check if a path is available for just the CIR (step 210). If a path is available (step 210), the OTN rate adjustment method 200 can configure the SNC with an ODU rate for the CIR on a selected path (step 212), and the SNC can operate at the selected ODU rate (step 208). Note, the OTN adjustment method 200 can also potentially configure the SNC for less than the CIR if no path is available. Again, the selected ODU rate can be standard, fixed ODUk rates (where k=0, 1, 2, 2e, 3, 3e2, 4, etc.) or ODUflex variable rates. For ODUflex (constant bit rate or CBR), the rates of the ODUflex can be a nominal rate of the CBR client bit rate× 239/238. For ODUflex (generic framing procedure or GFP), the rates of the ODUflex can be multiples of approximately 1.25 Gbit/s, to correspond to the capacity of an integer number, n, of higher order ODU tributary slots.

The OTN rate adjustment method 200 continues with the SNC operating at the selected ODU rate (step 208) until a rate adjustment is required (step 214). The OTN rate adjustment method 200 contemplates the rate adjustment may be required for a variety of reasons such as, without limitation, during restoration, to alleviate congestion, to improve network utilization, etc. The OTN rate adjustment method 200 includes adjusting the SNC to a new ODU rate based on the rate adjustment (step 216). The adjusting can be up or down, i.e. the new ODU rate can be greater than or less than the selected ODU rate. In an exemplary embodiment, the new ODU rate is less than the PIR but greater than or equal to the CIR. Alternatively, the new ODU rate could be less than the CIR in some exemplary embodiments. For example, to alleviate congestion or during restoration, it is likely the new ODU rate will be less than the selected ODU rate. Alternatively, the new ODU rate may be greater than the selected ODU rate to increase network utilization.

The OTN rate adjustment method 200 contemplate various techniques to hitlessly, in-service adjust the rate of the SNC from the selected ODU rate to the new ODU rate. In an exemplary embodiment, if the SNC uses ODUflex, the OTN rate adjustment method 200 can use the resizing methods described in ITU-T G.7044. These resizing methods include hitless adjustment of ODUflex(GFP) (HAO) that allows it to support an increase or decrease of ODUflex(GFP) client data rate across its entire end-to-end path. The HAO is similar to the virtual concatenation/link capacity adjustment scheme (VCAT/LCAS). In another exemplary embodiment, the OTN rate adjustment method 200 can use resizing methods between static ODUk rates (e.g., ODU2 to ODU2e, ODU3 to ODU2, etc.). Also, the OTN rate adjustment method 200 can resize between concatenated (e.g., using VCAT) ODUk's— for example, A×ODU0 to B×ODU0, etc. Those of ordinary skill in the art will recognize that other resizing methods are also contemplated by the OTN rate adjustment method 200. While the OTN rate adjustment method 200 could be applied to ODUk SNC rates, the use of ODUflex could provide more granularities for the ODU SNC rate. For instance, reducing an ODUk from ODU3 to ODU2 would lower the client rate from 40 G to 10 G; however an ODUflex could be lowered from 40 G to 30 G in increments of approximately 1.25 G. In a failure scenario, upon repair of the network, the control plane 140 could revert the SNC to the original rate; this reversion could be done by moving the SNC to the original path or increasing the size of the SNC on the current path.

Figure 3:
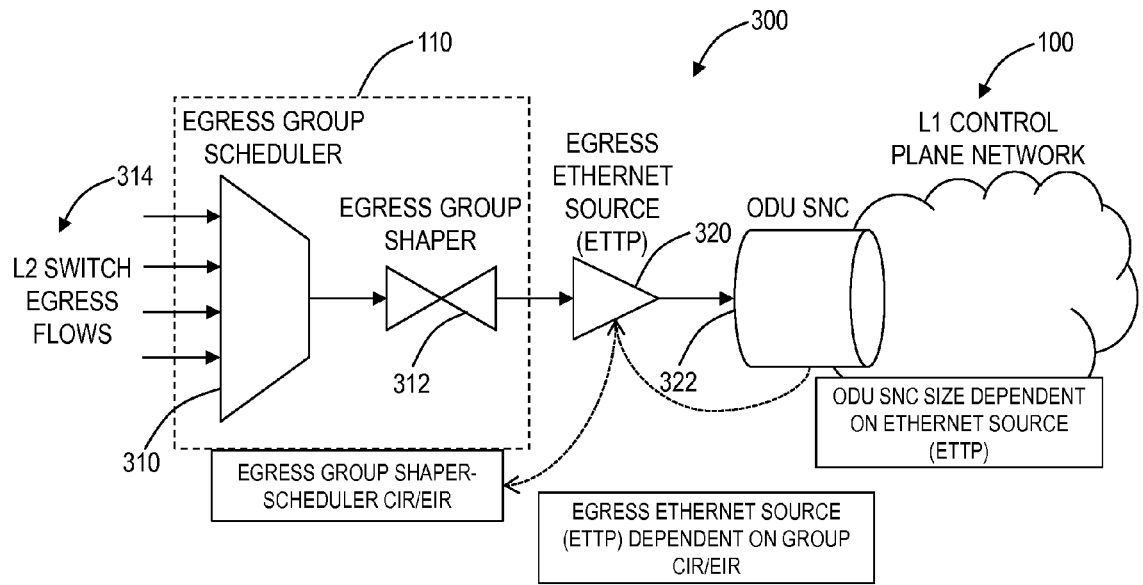
FIG. 3 is a network diagram of an exemplary scenario of efficient restoration via a node communicatively coupled to the OTN network of FIG. 1.

Referring to FIGS. 3 and 4, in an exemplary embodiment, a network diagram illustrates exemplary scenarios 300, 302 of efficient restoration via a node 110 communicatively coupled to the OTN network 100. Again, the OTN rate adjustment method 200 can be used for efficient restoration to resize SNCs accordingly responsive to a network failure. After the network failure, the control plane 140 may not be able to restore some or all of the affected Layer 1 SNC's due to limited bandwidth in the OTN network 100. The OTN rate adjustment method 200 allows the control plane 140 to reduce the size some or all of the SNC's to allow restoration. This reduction could be performed by one of the two exemplary scenarios 300, 302 based on the type of equipment available at the nodes 110.

The first exemplary scenario 300 applies to the nodes 110 with a Layer 2 scheduler 310 and shaper 312 available, and FIG. 3 illustrates an example of this capability. The Layer 2 provisioning provides the Committed Information Rate (CIR) and Excess Information Rate (EIR) of an incoming client signal or aggregated client signals (collectively client signal 314). Nominally, the initial ODU SNC rate (i.e., the selected ODU rate) is based on the Peak Information Rate (PIR) (PIR=CIR+EIR) of the client signal 314. During restoration, if the full rate ODU SNC cannot be restored or it is desirable not to restore the full rate ODU SNC (so that other SNCs can also be restored), the OTN rate adjustment method 200 could reduce the rate of the ODU SNC (i.e., the new ODU rate) to the client CIR rate (or some other value). The control plane 140 could then attempt to restore the lower rate ODU SNC which would take less available bandwidth in the network 100 and thereby make it easier to restore multiple connections. Upon restoration of the ODU SNC, the node 110 would utilize the Layer 2 shaper 312 and scheduler 310 to reduce the packet rate into the lower rate ODU SNC. The node 110 can include an egress Ethernet source (ETTP) 320 that interfaces to an ODU SNC 322.

The second exemplary scenario 302 applies to the nodes 110 with only Layer 2 Pause capability, and FIG. 4 illustrates an example of this capability. The Layer 2 provisioning provides the maximum and minimum rate of the client signal, i.e. the PIR and the CIR. During restoration, if the full rate ODU SNC cannot be restored or it is desirable not to restore the full rate ODU SNC, the node 110 could reduce the rate of the ODU SNC to the client minimum rate. The control plane 140 could then attempt to restore the lower rate ODU SNC which would take less available bandwidth in the network. Upon restoration of the ODU SNC, the node 110 could send pause frames to the client to match the lower ODU SNC rate.

Figure 5:
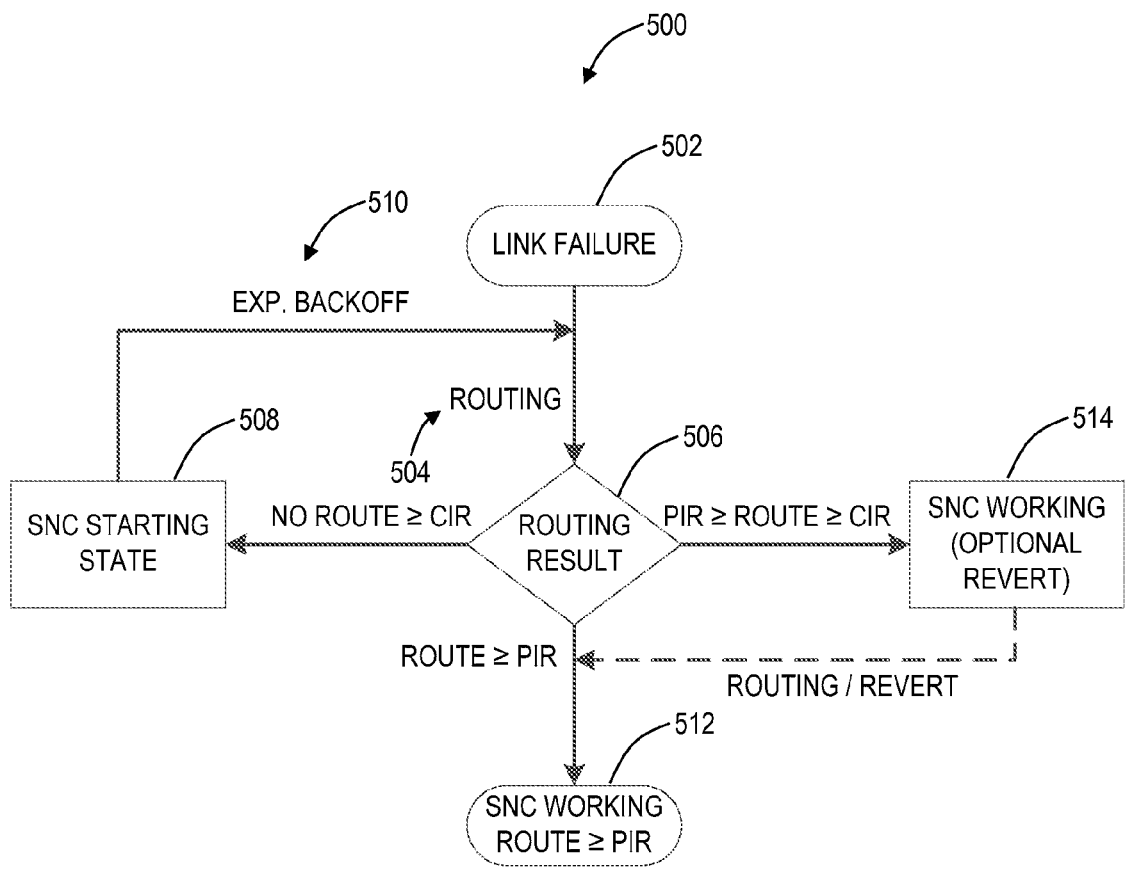
FIG. 5 is a flowchart of a routing method for using the OTN rate adjustment method in restoration scenarios.

Referring to FIG. 5, in an exemplary embodiment, a flowchart illustrates a routing method 500 for using the OTN rate adjustment method 200 in restoration scenarios. Similar to the OTN rate adjustment method 200, the routing method 500 contemplates operation in the OTN network 100, on and between the nodes 110, with the control plane 140, and/or via a centralized controller such as a path computation element (PCE), software defined networking (SDN) controller, etc. In a failure scenario, the decision by the control plane 140 to resize an SNC is dependent on the available bandwidth in the network 100 as reported by the control plane 140. The routing method 500 is implemented responsive to a link failure (step 502), and subsequently performs routing 504 of SNCs affected by the link failure to achieve a routing result for each of the SNCs (step 506). Again, the routing 504 can be performed by the control plane 140, a PCE, an SDN controller, an OpenFlow controller, etc. The routing 504 can use various techniques known in the art to reroute all of the affected SNCs away from the link failure. The routing method 500 is used to resize one or more of the affected SNCs where there is no valid routing result.

For each affected SNC, the routing result (step 506) an include one of three outcomes. First, if there is no route for an affected SNC that can support its associated CIR, i.e. no route≥CIR, the SNC goes into an SNC starting state (step 508) and performs an exponential backoff 510 before rerunning the routing 504. Second, if there is a route that can support the SNC's PIR, i.e. route≥PIR, the SNC is switched to this route as the working route (step 512). Third, if the route can support the CIR, but not the PIR, i.e. PIR≥route≥CIR, then the SNC can be restored to this route subsequent to a rate adjustment (step 514), and optionally the SNC can be rerouted or reverted to another route later that can support the PIR.

Figure 6:
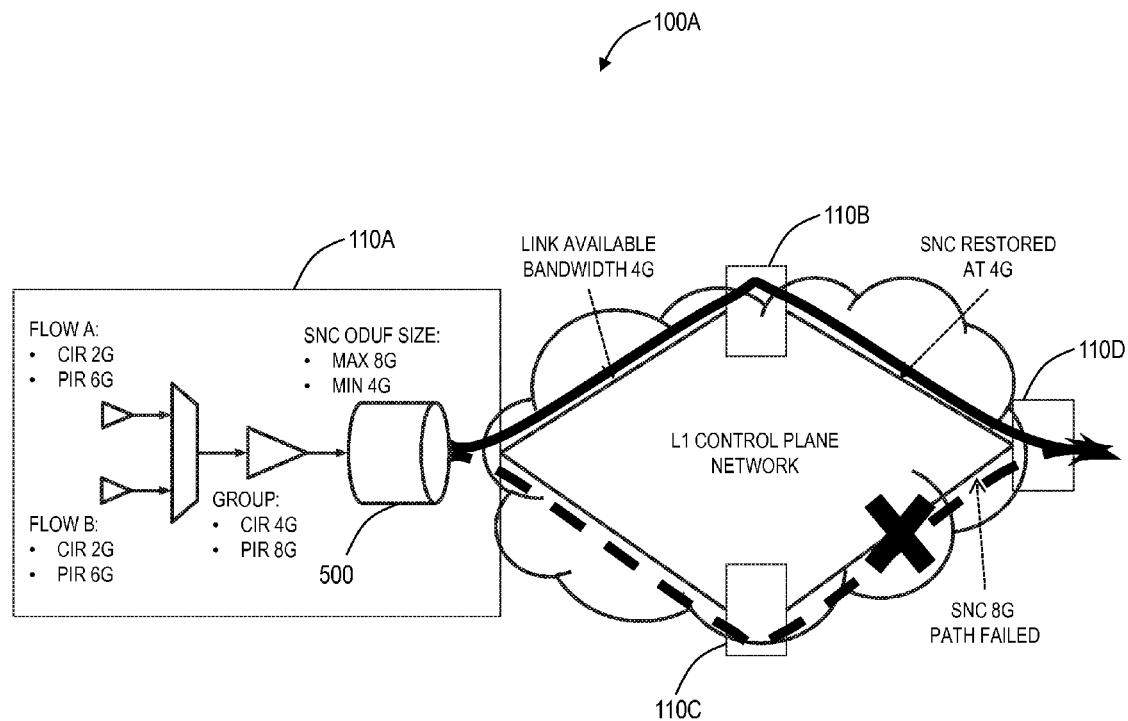
FIG. 6 is a network diagram of a network with four nodes to illustrate an example of SNC resizing during mesh restoration.

Referring to FIG. 6, in an exemplary embodiment, a network diagram illustrates a network 100A with four nodes 110A, 110B, 110C, 110D to illustrate an example of SNC resizing during mesh restoration. The network 100A, similar to the network 100, is a Layer 1 control plane network and includes the four nodes 110A, 110B, 110C, 110D in an interconnected mesh. The node 110A is shown as an ingress node for an SNC 500 and the node 110D is an egress node. The SNC 500 includes two client flows, flow A with a CIR of 2 G and a PIR of 6 G and flow B with a CIR of 2 G and a PIR of 6 G, for a group of CIR of 4 G and PIR of 8 G. The ODUflex SNC 500 original size is based on the Layer 2 services Flow A and Flow B; each has a CIR of 2 G and an EIR of 4 G, giving a PIR of 6 G. The Group CIR is 4 G and PIR 8 G resulting in an ODUflex of minimum size 4 G and maximum size 8 G. The ODUflex of size 8 G is added to the Layer 1 network as a mesh restorable SNC.

Assume the SNC 500 is initially routed between the nodes 110A, 110D via the node 110C at the maximum size of 8 G. Also, assume the link between the nodes 110A, 110B only has 4 G of bandwidth available. In the event the SNC 500 fails such as via a failure between the nodes 110C, 110D, the 100A will first attempt to restore the full service as an ODUflex of size 8 G. Since the link between the nodes 110A, 110B has available bandwidth limited to 4 G, a normal fixed size SNC would not be able to restore and the services would be failed. However, because the SNC 500 can be resized, the control plane 140 restores the SNC 500 at an ODUflex rate of 4 G, and the Layer 2 services can be maintained at the Service Layer Agreement CIR of 2 G each.

Figure 7:
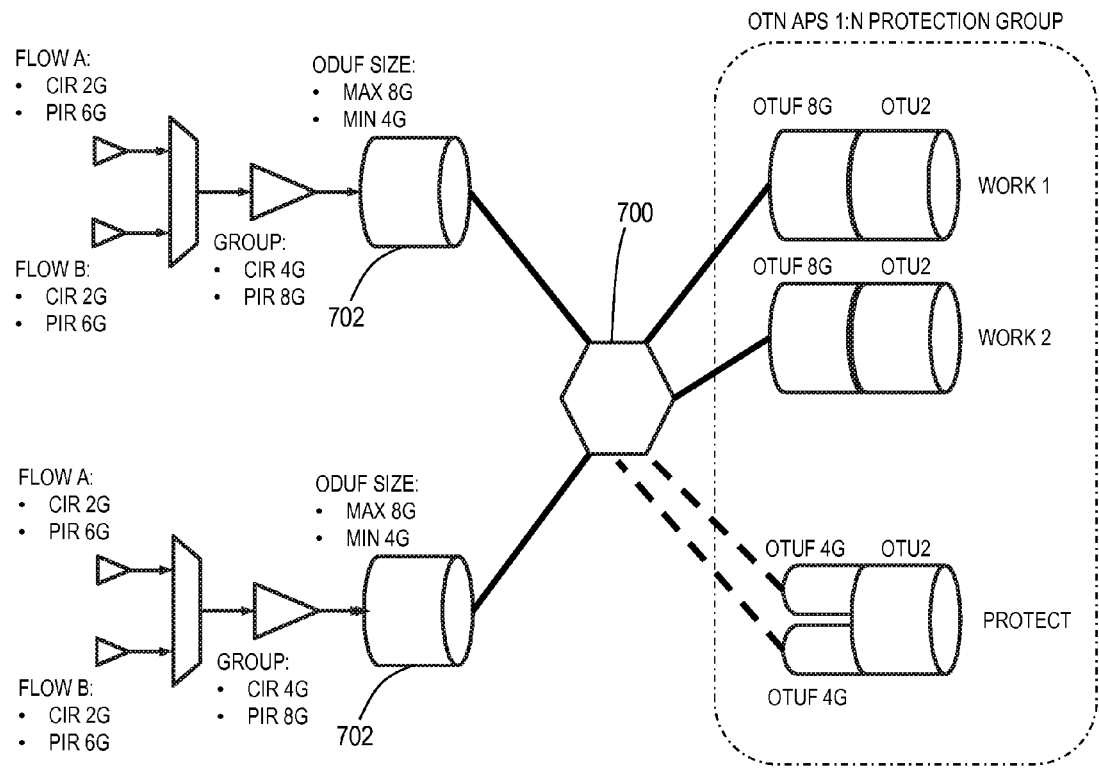
FIG. 7 is a block diagram of a 1:N OTN protection scheme utilizing the OTN rate adjustment systems and methods.

Referring to FIG. 7, in an exemplary embodiment, a block diagram illustrates a 1:N OTN protection scheme 700 utilizing the OTN rate adjustment systems and methods. The 1:N OTN protection scheme 700 is illustrated with reference to two identical ODUflex SNCs 702. The SNCs 702 include two client flows, flow A with a CIR of 2 G and a PIR of 6 G and flow B with a CIR of 2 G and a PIR of 6 G, for a group of CIR of 4 G and PIR of 8 G. The SNCs 702 original size is based on the Layer 2 services Flow A and Flow B; each has a CIR of 2 G and an EIR of 4 G, giving a PIR of 6 G. The Group CIR is 4 G and PIR 8 G resulting in an ODUflex of minimum size 4 G and maximum size 8 G. Note, the SNCs 702 are similar to the SNC 500. The SNCs 702 can be separate ODUflex SNCs of size 8 G while working, denoted as work 1 and work 2, but part of a 1:N protection group that allows one protect where each of the SNCs 702 are resized to 4 G (not the CIR of 2 G).

The OTN rate adjustment systems and methods can enable this 1:N protection scheme with OTN services as follows. For N working SNCs, each with a CIR of X and a PIR of Y, the N working SNCs can each be Y Gb/s. For the one protection channel, the N working SNCs are resized to fit into a single SNC of size Y Gb/s as long as Y/N is greater than or equal to X. In the example of FIG. 7, X=4 G, Y=8 G, and N=2. Other variations can be used to create different number of working channels, N, and/or different bandwidth values for X and Y. For an arbitrary value of N, X and Y have to be selected such that Y/X≥N. Also, any of the variables, N, X, and Y, can be fixed or variable depending on the application.

Figure 8:
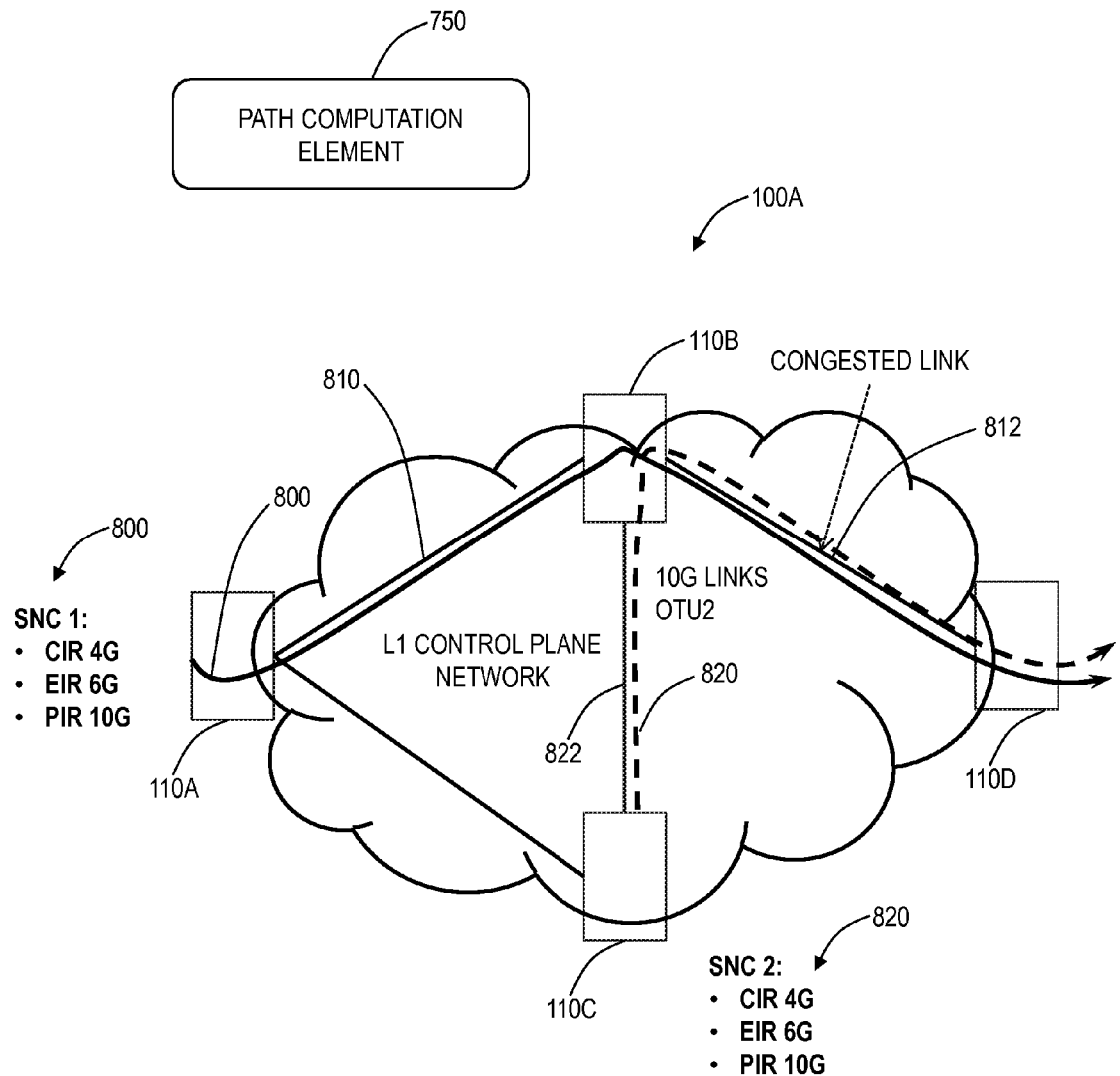
FIG. 8 is a network diagram of the network of FIG. 6 using the OTN rate adjustment method of FIG. 2 for congestion control.

Referring to FIG. 8, in an exemplary embodiment, a network diagram illustrates the network 100A using the OTN rate adjustment method 200 for congestion control. Specifically, the OTN rate adjustment systems and methods can be extended to work with routing, such that EIR bandwidth utilization is advertised as part of network element (NE) link state information. EIR bandwidth is treated by the router as available bandwidth to be used if no unused bandwidth is available to support the circuit. In this case, a routing engine, at the nodes 110 and/or a centralized controller, computes a route that has enough available BW (Unused BW+EIR BW) to support the circuit. For congestion control, the endpoints for existing circuits are signaled to release a fraction of their EIR bandwidth. Hitless ODU Flex Resizing is initiated at end-points to reduce circuit size. This fractional reduction in size is done fairly for all SNCs that traverse the choke points in the network 100A. The fraction must be large enough to accommodate the worst case choke point, to accommodate a new circuit.

FIG. 8 illustrates an example of fair reduction in the network 100A which can include a path computation element (PCE) 750. In general, the PCE 750 can be configured to implement the various routing systems and methods described herein. That is, the PCE 750 can abstract a topology of the network 100A, compute a paths for SNCs of given CIR, PIR, etc. The PCE 750 can be an application that can be located within one of the nodes 110 or a component, such as on server communicatively coupled to one or more of the nodes 110. PCEs are defined in various RFC's from the IETF such as, for example, RFC 4655 "A Path Computation Element (PCE)-Based Architecture," RFC 4657 "Path Computation Element (PCE) Communication Protocol Generic Requirements," RFC 4674 "Requirements for Path Computation Element (PCE) Discovery," RFC 4927 "Path Computation Element Communication Protocol (PCECP) Specific Requirements for Inter-Area MPLS and GMPLS Traffic Engineering," RFC 5376 "Inter-AS Requirements for the Path Computation Element Communication Protocol (PCECP)," RFC 5394 "Policy-Enabled Path Computation Framework," RFC 5440 "Path Computation Element (PCE) Communication Protocol (PCEP)," and the like, each of which is incorporated by reference herein. While described herein with respect to the PCE 750, the systems and methods described herein can use other centralized approaches such as via a management system, SDN controller, or the like.

In the example of FIG. 8, an SNC 1 800 is provisioned to have CIR=4 G and EIR=6 G. The SNC 1 800 is initially using all of its PIR (client can burst to full link bandwidth of 10 G, 6 G above its committed 4 G), occupying all 8×1.25 G tributary slots on OTU2 links 810, 812. A network operator wishes to create another SNC 2 820 from the nodes 110C, 110D via the node 110B, also with CIR=4 G and PIR=6 G. The PCE 750 determines that a route exists for SNC 2 820 on links 822, 812C-B-D with choke point on the link 812. Congestion control is applied to SNC 1 800 and the SNC 2 820 using fair reduction −5 G per SNC. The SNC 1 800 resizes to 5 G or 4×1.25 G tributary slots using hitless G.7044 flex resizing, and the SNC 2 820 sets up at 5 G on the remaining 4×1.25 G tributary slots. Each client can now burst up to 5 G, committed rate of 4 G is still met for each SNC 800, 820. An inverse process can be performed for removal of a circuit to allow SNCs to increase in size up to their provisioned PIR values.

The control plane 140 can be distributed and/or via the centralized PCE 750. A variety of max-min fair allocation algorithms can be used to determine SNC resize values. These algorithms may have varying degrees of complexity. For a simple example: at the bottleneck (highest point of congestion) determine the amount of congestion X, where $$X = \sum_{i=1}^{n} PIRi - LinkBW;$$

where 1 through n is the set of SNCs on the link, and PIR is the maximum provisioned peak information rates for each SNC on the link (including the new SNC being set up). Adjust the size values for each SNC on the link to:

$$SNC_{size} = CIR + EIR\left(1 - X/\sum_{i=1}^{n} EIRi\right)$$

Move on the next most congested link, re-compute X, and repeat the calculation for the remaining SNCs and links in descending order. The above is just one example, but any valid algorithm could be used.

Conventionally, layer 1 OTN connections are of fixed size and do not adapt to higher layer CIR/PIR and if the OTN connection size changes it is typically a result of operator intervention. The OTN rate adjustment systems and methods introduce CIR, EIR, and PIR concepts into layer 1 OTN connections coupled with hitless resizing for various advantages in OTN networks. The OTN rate adjustment systems and methods allow services, which may not be restorable after a network failure, to restore by using less network resources. Additionally, the OTN rate adjustment systems and methods allow the addition of services to a network without increasing the network resources by reducing the rate Layer 1 services as allowed by supported Layer 2 services. The OTN rate adjustment systems and methods apply dynamic bandwidth allocation, congestion control, and CIR/EIR based SLAs typically applied to packet based technology to OTN networks and layer 1 and layer 2/3 interworking.

Again, the OTN rate adjustment systems and methods offer the ability of the control plane 140 to resize an ODU SNC to improve the possibility of restoration and bandwidth utilization requires interworking between Layer 1 control plane, Layer 2 traffic management, and the flexibility of the OTN rate to be adjusted. The combination of these aspects presents a novel solution to the inflexibility of the transport layer during service restoration and circuit creation/deletion. Inclusion of the OTN rate adjustment systems and methods into control plane networks decreases the utilization of network resources during network failures and allow more services to be restored and more efficient use of the network as well as offering increased network utilization.

Figure 9:
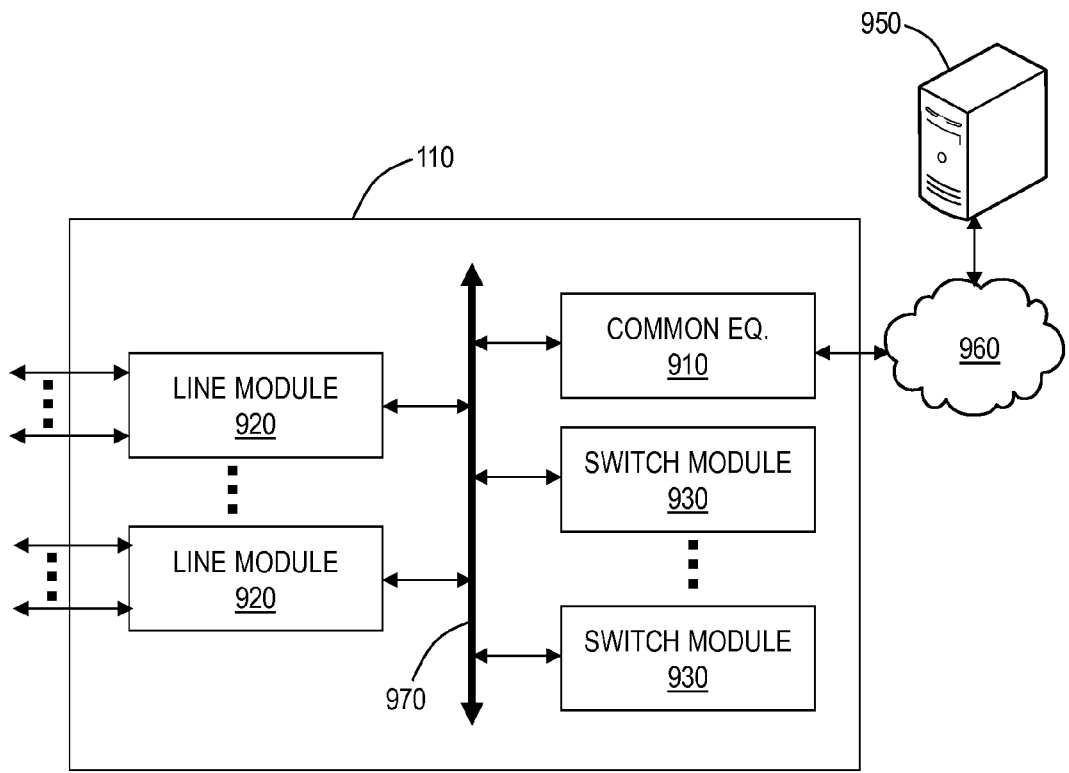
FIG. 9 is a block diagram of an exemplary node for use with the methods and systems described herein and in the aforementioned networks.

Referring to FIG. 9, in an exemplary embodiment, a block diagram illustrates an exemplary node 110 for use with the methods and systems described herein. In an exemplary embodiment, the exemplary node 110 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 110 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 110 can be any digital system with ingress and egress digital signals and switching therebetween of channels, timeslots, tributary units, etc. utilizing OTN, etc. While the node 110 is generally shown as an optical network element, the systems and methods contemplated for use with any switching fabric, network element, or network based thereon.

In an exemplary embodiment, the node 110 includes common equipment 910, one or more line modules 920, and one or more switch modules 930. The common equipment 910 can include power; a control module; operations, administration, maintenance, and provisioning (OAM&P) access; user interface ports; and the like. The common equipment 910 can connect to a management system 950 through a data communication network 960 (as well as a PCE, SDN controller, OpenFlow controller, etc.). The management system 950 can include a network management system (NMS), element management system (EMS), or the like. Additionally, the common equipment 910 can include a control plane processor configured to operate the control plane 140 as described herein. The node 110 can include an interface 970 for communicatively coupling the common equipment 910, the line modules 920, and the switch modules 930 therebetween. For example, the interface 970 can be a backplane, mid-plane, a bus, optical or electrical connectors, or the like. The line modules 920 are configured to provide ingress and egress to the switch modules 930 and external to the node 110. In an exemplary embodiment, the line modules 920 can form ingress and egress switches with the switch modules 930 as center stage switches for a three-stage switch, e.g. a three stage Clos switch. Other configurations and/or architectures are also contemplated. The line modules 920 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 920 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 920 can include wavelength division multiplexing interfaces, short reach interfaces, and the like, and can connect to other line modules 920 on remote network elements, end clients, edge routers, and the like. From a logical perspective, the line modules 920 provide ingress and egress ports to the node 110, and each line module 920 can include one or more physical ports. The switch modules 930 are configured to switch channels, timeslots, tributary units, etc. between the line modules 920. For example, the switch modules 930 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 930 can include both Time Division Multiplexed (TDM) (i.e., circuit switching) and packet switching engines. The switch modules 930 can include redundancy as well, such as 1:1, 1:N, etc. In an exemplary embodiment, the switch modules 930 provide OTN switching and/or Ethernet switching.

Those of ordinary skill in the art will recognize the node 110 can include other components which are omitted for illustration purposes, and that the systems and methods described herein are contemplated for use with a plurality of different network elements with the node 110 presented as an exemplary type of network element. For example, in another exemplary embodiment, the node 110 may not include the switch modules 930, but rather have the corresponding functionality in the line modules 920 (or some equivalent) in a distributed fashion. For the node 110, other architectures providing ingress, egress, and switching therebetween are also contemplated for the systems and methods described herein. In general, the systems and methods described herein contemplate use with any network element providing switching of OTN channels, timeslots, tributary units, wavelengths, etc. Furthermore, the node 110 is merely presented as one exemplary node 110 for the systems and methods described herein.

Figure 10:
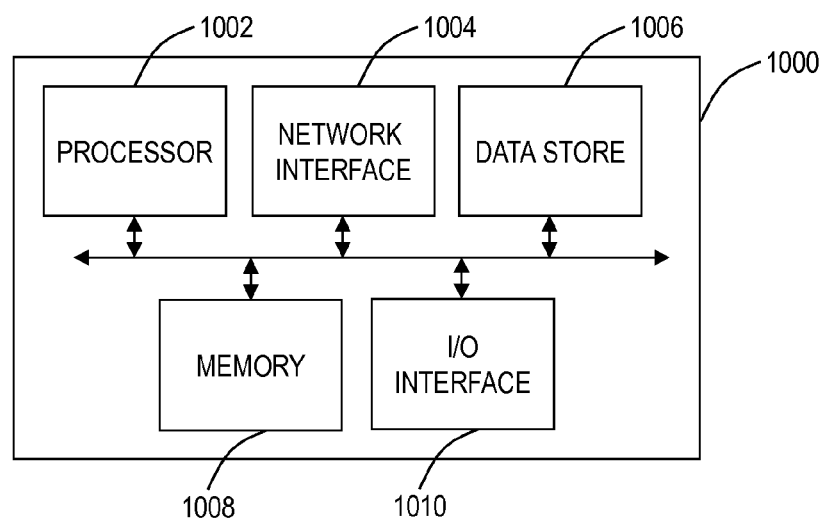
FIG. 10 is a block diagram illustrates a controller to provide control plane processing and/or operations, administration, maintenance, and provisioning (OAM&P) for the node of FIG. 9.

Referring to FIG. 10, in an exemplary embodiment, a block diagram illustrates a controller 1000 to provide control plane processing and/or operations, administration, maintenance, and provisioning (OAM&P) for the node 110. The controller 1000 can be part of common equipment, such as common equipment 910 in the node 110, or a stand-alone device (e.g., a PCE) communicatively coupled to the node 110 via the DCN 960. The controller 1000 can include a processor 1002 which is hardware device for executing software instructions such as operating the control plane. The processor 1002 can be any custom made or commercially available processor, a central processing unit (CPU), an auxiliary processor among several processors associated with the controller 1000, a semiconductor-based microprocessor (in the form of a microchip or chip set), or generally any device for executing software instructions. When the controller 1000 is in operation, the processor 1002 is configured to execute software stored within memory, to communicate data to and from the memory, and to generally control operations of the controller 1000 pursuant to the software instructions. The controller 1000 can also include a network interface 1004, a data store 1006, memory 1008, an I/O interface 1010, and the like, all of which are communicatively coupled therebetween and with the processor 1002.

The network interface 1004 can be used to enable the controller 1000 to communicate on the DCN 960, such as to communicate control plane information to other controllers, to the management system 950, and the like. The network interface 1004 can include, for example, an Ethernet card (e.g., 10 BaseT, Fast Ethernet, Gigabit Ethernet) or a wireless local area network (WLAN) card (e.g., 802.11a/b/g). The network interface 1004 can include address, control, and/or data connections to enable appropriate communications on the network. The data store 1006 can be used to store data, such as control plane information, provisioning data, OAM&P data, etc. The data store 1006 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 1006 can incorporate electronic, magnetic, optical, and/or other types of storage media. The memory 1008 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 1008 may incorporate electronic, magnetic, optical, and/or other types of storage media. Note that the memory 1008 can have a distributed architecture, where various components are situated remotely from one another, but may be accessed by the processor 1002. The I/O interface 1010 includes components for the controller 1000 to communicate to other devices. Further, the I/O interface 1010 includes components for the controller 1000 to communicate with the other nodes, such as using overhead associated with OTN signals.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method in an Optical Transport Network (OTN) network, comprising:
   provisioning an end-to-end path with a defined committed information rate (CIR) and a peak information rate (PIR) via an optical control plane;
   computing a path for the end-to-end path based on the CIR and the PIR, wherein the path is an Optical Channel Data Unit (ODU) in the OTN network and is computed to support the PIR if there is a path to support the PIR and is computed to at least support the CIR if there is no path to support the PIR;
   configuring the end-to-end path on the computed path at an ODU data rate supporting the PIR if the computed path can support the PIR or at the ODU data rate supporting the CIR if the computed path can support the CIR and not the PIR; and
   adjusting the ODU data rate of the end-to-end path based on a rate adjustment requirement in the OTN network and based on the CIR and the PIR.

2. The method of claim 1, wherein the rate adjustment requirement is based on one of restoration, congestion control, and network utilization.

3. The method of claim 1, further comprising:
   detecting a network failure in the OTN network and being unable to restore the end-to-end path at the PIR; and
   performing the adjusting of the ODU data rate such that the end-to-end path can be restored from the network failure.

4. The method of claim 1, further comprising:
   provisioning a second end-to-end path with an associated CIR and PIR;
   determining a congested link shared by the end-to-end path and the second end-to-end path preventing the second end-to-end path from being configured at its associated CIR; and
   implementing a fair reduction in size of the end-to-end path enabling the second end-to-end path to be set up.

5. The method of claim 1, wherein the end-to-end path comprises one of an Optical channel Data Unit level k (ODUk) and an Optical Channel Data Unit-flex (ODUflex).

6. The method of claim 1, wherein the end-to-end path comprises an Optical channel Data Unit level k (ODUk) and the adjusting comprises switching between different values of k with k=0, 1, 2, 2e, 3, 3e2, 4 and shaping client traffic input therein.

7. The method of claim 1, wherein the end-to-end path comprises an Optical Channel Data Unit-flex (ODUflex) and the adjusting comprises utilizing hitless ODUflex resizing mechanisms defined in ITU-T G.7044.

8. The method of claim 1, further comprising:
   altering a rate of client flows into the end-to-end path subsequent to the rate adjustment with a scheduler and shaper.

9. The method of claim 1, further comprising:
   altering a rate of client flows into the end-to-end path subsequent to the rate adjustment via Layer 2 pauses.

10. The method of claim 1, further comprising:
    performing the computing and the configuring via one of a control plane, a management system, a path computation element (PCE), a software defined networking (SDN) controller, an OpenFlow controller, and a combination thereof.

11. A controller, comprising:
a processor;
memory storing instructions that, when executed, cause the processor to:
receive a request for an end-to-end path with a defined committed information rate (CIR) and a peak information rate (PIR) in an Optical Transport Network (OTN)-based network;
compute a path for the end-to-end path based on the CIR and the PIR, wherein the path is an Optical Channel Data Unit (ODU) in the OTN-based network and is computed to support the PIR if there is a path to support the PIR and is computed to at least support the CIR if there is no path to support the PIR;
cause the end-to-end path to be configured on the computed path at an ODU data rate supporting the PIR if the computed path can support the PIR or at the ODU data rate supporting the CIR if the computed path can support the CIR and not the PIR; and
cause the ODU data rate to be adjusted based on a rate adjustment requirement in the OTN-based network and based on the CIR and the PIR.

12. The controller of claim 11, wherein the rate adjustment requirement is based on one of restoration, congestion control, and network utilization.

13. The controller of claim 11, wherein the instructions, when executed, further cause the processor to:
detect a network failure in the OTN-based network with an inability to restore the end-to-end path at the PIR; and
cause the ODU data rate to be adjusted such that the end-to-end path can be restored from the network failure.

14. The controller of claim 11, wherein the instructions, when executed, further cause the processor to:
receive a request to provision a second end-to-end path with an associated CIR and PIR;
determine a congested link shared by the end-to-end path and the second end-to-end path preventing the second end-to-end path from being configured at its associated CIR; and
cause a fair reduction in size of the end-to-end path enabling the second end-to-end path to be set up.

15. The controller of claim 11, wherein the end-to-end path comprises one of an Optical channel Data Unit level k (ODUk) and an Optical Channel Data Unit-flex (ODUflex).

16. The controller of claim 11, wherein the end-to-end path comprises an Optical channel Data Unit level k (ODUk) and the adjusting comprises switching between different values of k with k=0, 1, 2, 2e, 3, 3e2, 4 and shaping client traffic input therein.

17. The controller of claim 11, wherein the end-to-end path comprises an Optical Channel Data Unit-flex (ODUflex) and the adjusting comprises utilizing hitless ODUflex resizing mechanisms defined in ITU-T G.7044.

18. The controller of claim 11, wherein the controller comprises one of a control plane processor communicatively coupled to a node, a management system, a path computation element (PCE), a software defined networking (SDN) controller, an OpenFlow controller, and a combination thereof.

19. A Optical Transport Network (OTN)-based network, comprising:
a plurality of interconnected nodes operating an optical control plane there between;
an end-to-end path controlled by the optical control plane with a defined committed information rate (CIR) and a peak information rate (PIR) implemented through at least two of the plurality of interconnected nodes, wherein the end-to-end path is an Optical Channel Data Unit (ODU) in the OTN-based network and supports the PIR if there is a path to support the PIR and at least supports the CIR if there is no path to support the PIR; and
a controller configured to cause the end-to-end path to adjust an ODU data rate based on a rate adjustment requirement in the OTN-based network and based on the CIR and the PIR.

20. The OTN-based network of claim 19, wherein the rate adjustment requirement is based on one of restoration, congestion control, and network utilization.

* * * * *